US010539276B2

(12) United States Patent
Inskeep

(10) Patent No.: US 10,539,276 B2
(45) Date of Patent: *Jan. 21, 2020

(54) HIGH POWER RECHARGEABLE SPOTLIGHT WITH TWO WAY UNIVERSAL SERIAL BUS

(71) Applicant: Vector Products, Inc., Boca Raton, FL (US)

(72) Inventor: Mathew Inskeep, Highland Beach, FL (US)

(73) Assignee: VECTOR PRODUCTS, INC, Boca Raton, FL (US)

( * ) Notice: Subject to any disclaimer, the term of this patent is extended or adjusted under 35 U.S.C. 154(b) by 370 days.

This patent is subject to a terminal disclaimer.

(21) Appl. No.: 15/378,142

(22) Filed: Dec. 14, 2016

(65) Prior Publication Data

US 2018/0166890 A1 Jun. 14, 2018

(51) Int. Cl.

| H02J 1/10 | (2006.01) |
| H02J 3/46 | (2006.01) |
| F21L 4/08 | (2006.01) |
| H02J 7/00 | (2006.01) |
| F21V 23/06 | (2006.01) |
| F21V 23/04 | (2006.01) |

(52) U.S. Cl.
CPC ............... *F21L 4/08* (2013.01); *H02J 7/0042* (2013.01); *F21V 23/0414* (2013.01); *F21V 23/06* (2013.01); *H02J 2007/0062* (2013.01)

(58) Field of Classification Search
CPC ......... F21L 4/08; F21L 4/085; H01R 13/642; H02J 7/0054; H02J 2007/0062; H02J 7/0042; H05B 33/0803; H05B 33/0815; F21Y 2101/00; F21Y 2115/10; F21V 23/0414; F21V 23/06
USPC ........... 307/24; 362/158, 183, 184; 320/107, 320/113, 114, 116
See application file for complete search history.

(56) References Cited

U.S. PATENT DOCUMENTS

2013/0038288 A1* 2/2013 Yeh ....................... H02J 7/0027
320/114

FOREIGN PATENT DOCUMENTS

CA 2858623 A1 * 2/2015 ......... H05B 33/0815

OTHER PUBLICATIONS

Stanley Fatmax Model SL10LEDS, pp. 1-7, Apr. 11, 2014 (Year: 2014).*

* cited by examiner

*Primary Examiner* — Rexford N Barnie
*Assistant Examiner* — Toan T Vu
(74) *Attorney, Agent, or Firm* — Daniel S. Polley, P.A.

(57) ABSTRACT

A high power rechargeable spotlight with two-way universal serial bus (USB) capable of recharging electronic devices as well as recharging itself. A bidirectional universal serial bus (USB) adaptor port that can be integrated into a high power rechargeable battery operated spotlight or other rechargeable battery operated device. The invention can utilize a microcontroller to convert a single USB adaptor port into either an input device or an output device. A high power rechargeable spotlight with bidirectional USB adaptor port is capable of recharging external electronic devices, as well as recharging itself through the same port.

19 Claims, 3 Drawing Sheets

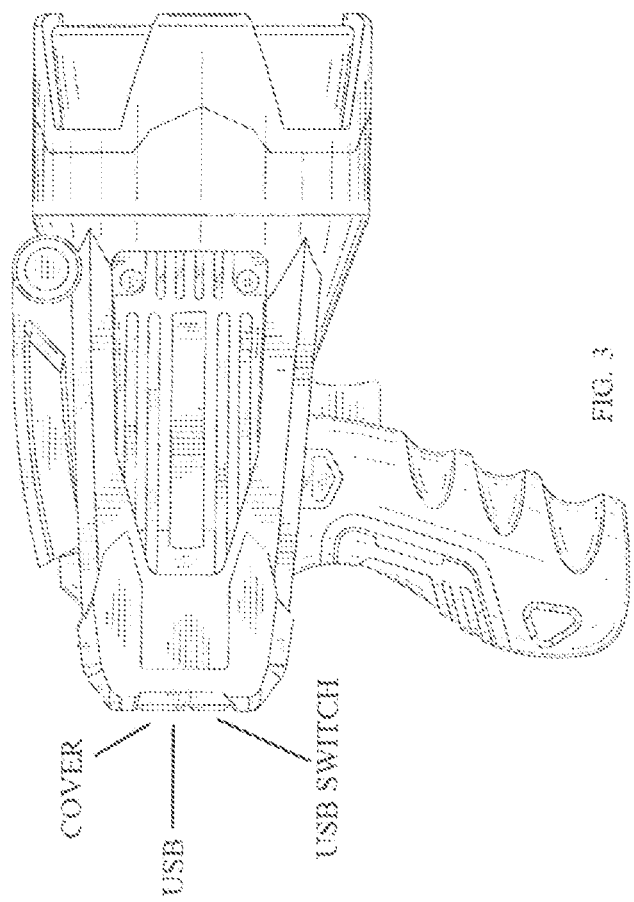

HIGH POWER RECHARGEABLE SPOTLIGHT WITH TWO WAY UNIVERSAL SERIAL BUS

BACKGROUND

Spotlights are useful portable devices that provide light to users in the event of power outages, nighttime outdoor activities and many other circumstances. Typically, spotlights do not have any other electrical functions besides providing a portable light source. The current disclosure is directed to increase the functionality of certain electronic devices, such as, but not limited to, spotlights.

SUMMARY OF THE DISCLOSURE

A handheld spotlight in one non-limiting embodiment is disclosed with integrated portable power capabilities via a two-way universal serial bus (USB), which allows for combining the utility of a spotlight and a backup power source for recharging various electronic devices that can be electrically connected to the spotlight at the USB port.

Disclosed is an electronic device, such as, but not limited to, a high power rechargeable spotlight with a two-way universal serial bus (USB). This handheld spotlight with integrated portable power capabilities via a two-way universal serial bus provides the utility of a traditional spotlight with the benefit of on the go backup power. Spotlights are useful portable light sources and are common to almost every home. With our increased reliance on smart phones, tablet style computers and related portable devices, backup power is essential when away from a primary charging source such as a home outlet or automobile. The disclosed electronic device with its universal serial bus with the assistance of an adapter is capable of powering and transferring energy to small rechargeable electronic devices. Additionally, the disclosed electronic device uses the same universal serial bus to draw energy from an external adapter to recharge its own internal battery. The disclosed electronic device utilizes USB adapters and modifies their electrical characteristics to allow the adapter to serve the two purposes of both powering and transferring energy to small electronics or recharging itself through the same port. Currently, other market available designs required dual adapters to accomplish this function. The user can take advantage of the disclosed electronic device by having a built-in USB adapter port that can recharge and power their small portable devices as well as acting as a rechargeable light source, namely a spotlight.

Thus, in one non-limiting embodiment, a spotlight is disclosed having a bidirectional USB Port. The electrical device provides a single electrical/USB port that can both recharge its own internal battery (i.e. inputting energy through the port) and also use the internal battery to power/charge an external electrical device (i.e. outputting energy through the port).

BRIEF DESCRIPTION OF THE DRAWINGS

FIG. 3 is a right side view of the preferred embodiment of a spotlight with a built in universal serial bus (USB), while also showing a cover that can be provided and which can cover the USB port and USB switch when the USB port is not in use.

DETAILED DESCRIPTION

Figure 1:
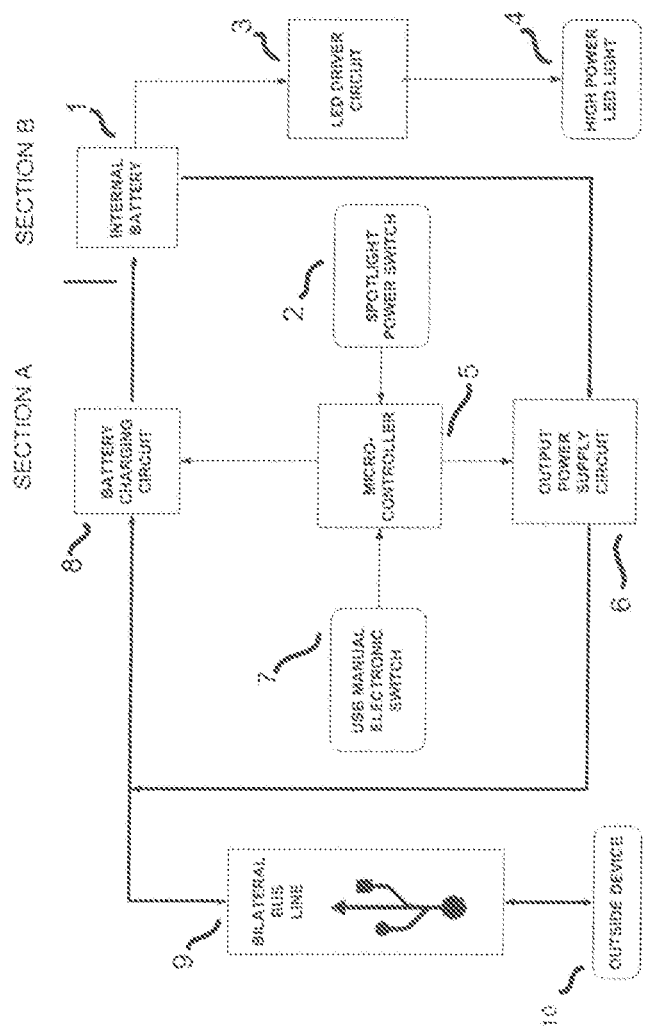
FIG. 1 is a block diagram of the internal functions of the universal serial bus (USB) control circuit for an electronic device and including the function of the rechargeable high power LED spotlight as one non-limiting embodiment for the electronic device.
Figure 2:
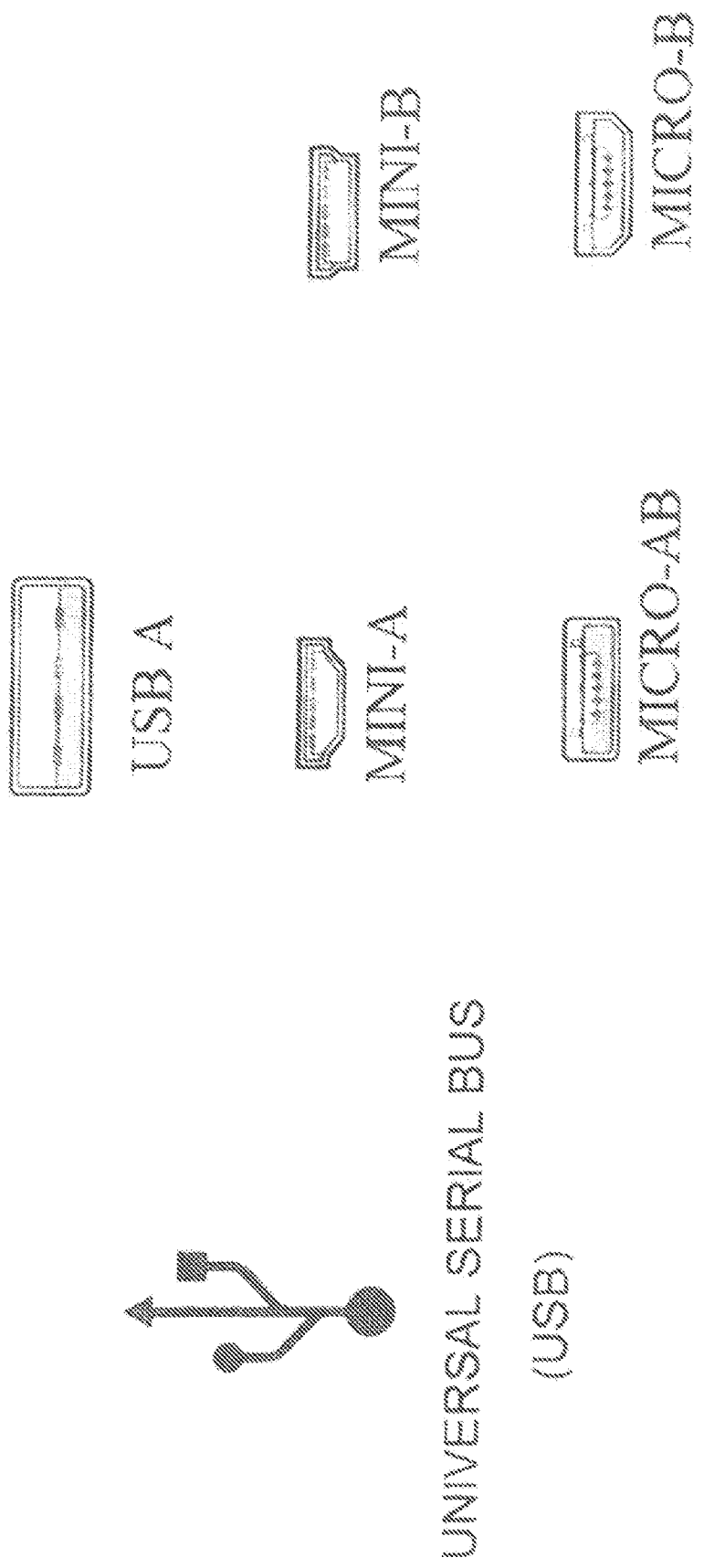
FIG. 2 is a physical appearance of universal serial ports available that can be used in combination with the spotlight.

FIG. 1 shows an internal diagram for the disclosed novel rechargeable electronic device and portable power source and its major electrical components. The circuitry can be divided into section A and section B. Section A describes the preferred major components and internal circuits of the bidirectional universal serial bus (USB) 9 circuit operation. Section B shows the internal circuit operation of the high power rechargeable spotlight which can be the preferred non-limiting embodiment for the electronic or electrical device.

Where the electronic device is a rechargeable device and a portable power source for charging other electrical devices, the combination of both circuits shown in FIG. 1 can be used. The USB adapter port 9 can be optimized for different situations. For example, the charging port's physical size and power carrying capabilities, to allow high efficiency power across various situations and need not be limited to only one type of adapter. It may take other form such as, without limitation, those shown in FIG. 2; USB A, Mini A, Micro AB, as well as other currently known or later developed adapters. Also, adapter port's 9 can provide for mechanically and electrically coupling the electronic device with any external electronic/electrical device with similar connectivity 10. The external device 10 can be directly coupled to the USB adapter port 9 or through an adapter USB extension cord.

In Section B of FIG. 1, an electronic device, such as, but not limited to, a High Power Rechargeable Spotlight, can be controlled when the spotlight power switch 2 is pressed/selected which causes a signal to be sent to the micro-controller 5 to tell it that the spotlight mode is active and therefore disable all other features. The LED driver circuit 3 is powered by the internal battery 1 which is used for powering LED light 4. It should also be recognized other types of light bulbs, in addition to LED light bulbs can be used and are considered within the scope of the disclosure. Here current flows from the internal battery, to the LED driver circuit 3 and finally into the high powered LED light 4. Thus, when the spotlight power switch 2 is selected, the spotlight mode is active and the USB/adapter 9 can be deactivated.

In order to charge/recharge internal battery 1 through battery charging circuit 8 or to charge/recharge an outside device 10 by output power supply circuit 6 with power/energy from internal battery 1, the USB manual electronic switch 7 is pressed/selected. Depending on which of these two uses is desired (i.e. whether an external device 10 is coupled to adapter port 9 to be recharged or battery 1 is to be recharged) determines whether the circuitry converts the USB adapter 9 into an input or output device where current is drawn from an external adapter to recharge the internal battery 1 or energy/power is outputted out of adapter 9 to recharge the outside device 10. Upon the selection of switch 7 and depending on what is coupled to adaptor 9, the micro-controller 5 processes this information and allows the current to flow in or out from the USB adapter port 9. Where current flows in from adapter 9, the direction of flow is to the battery charging circuit 8 for charging the internal battery 1. The charging circuit 8 can be a switching regulator. One of its functions is to limit the current and voltage potential to the internal battery 1 received from the USB adapter port 9, which can be five volt of direct current as per industry standard, though such is not considered limiting.

Where current flows out of adapter 9, the direction of current flow can be from internal battery 1 to output power supply circuit 6 out of adapter 9 and to the outside device 10 for recharging outside device 10. Thus, the second function of the universal serial bus (USB) 9 is to output and transfer energy from the internal battery 1 into small rechargeable electronic devices such as mobile phones, digital cameras, mp3 and similar consumer products Either mode (i.e. current in or current out) of use for the bilateral bus line/adapter 9 can be activated when the user selects to use the USB manual electronic switch 7. Preferably, the spotlight mode is deactivated upon selecting switch 7, though such is not considered limiting. The electronic switch 7 sends a signal to the micro-controller 5 indicating to toggle to one of the USB functions, such as, turning the USB adapter port 9 into a power sourcing device or for recharging internal battery 1. When used as a sourcing device, sourcing device means that the energy transfer will now flow from the internal battery 1 out to the external device 10. This can be accomplished by preferably having the micro-controller 5 send a signal to the output power supply circuit 6 to activate and transfer the energy from the internal battery 1 into the USB adapter port 9. The power supply circuit 6 can be a back regulator that lowers the higher potential voltage from the battery typically above seven volt of direct current down to five volt of direct current which is the industry standard output voltage of a USB adapter port 9. The power supply circuit 6 allows control of the maximum current deliver to the external device 10.

Thus, it is preferred that the power switch 2 for turning the spotlight on and off can be independent of the USB manual electronic switch 7 which is used for activating USB port 9 for recharging internal battery 1 or charging a coupled external device 10.

The circuitry show in FIG. 1 provides for a bi-directional electrical connection from an outside device 10 and the internal battery 1. The basic operation is the electrical transmission occurring between these two components which can be mechanically coupled through a single universal serial bus adapter 9. When an outside device 10 demands energy from the internal battery 1 the outside device acts as a load to the internal battery 1 or when an outside device is transferring energy to the internal battery 1 the outside device acts as energy source to the internal battery. Similarly, the internal battery 1 is fit to be a load or a source to an outside device. Thus, both the outside device and internal battery 1 can be a source or a load at times; but they are always electrically opposite to each other while in their predetermined mode (if one device is a source, the other is a load and vice versa). The bi-directional lines shown in FIG. 1 are used for describing both modes of operation. The disclosed novel electronic device accommodates both modes of operation using the same universal serial bus adapter 9 and switching the electrical flow of energy utilizing a single universal serial bus.

FIG. 3 illustrates one non-limiting spotlight embodiment for the electronic device, and showing a protective cover component of the spotlight which can either cover adaptor port 9 or expose or otherwise provide access to port 9. In one non-limiting embodiment, the cover can be plugged into the adapter port 9 to cover it. Though a spotlight is shown, a cover can also be provided with other electronic devices incorporating the disclosed bilateral bus line with adapter port 9 and such other electronic devices are considered within the scope of the disclosure.

The cover provides for protection to an otherwise unprotected electrical output of the universal serial bus and its associated power switch. Preferably, the protective cover mechanically couples to the body of the electronic device/ spotlight and can be plugged into the adapter port 9. When the cover is fully plugged into the adaptor port 9, it cart provide protection to the otherwise exposed electrical circuit against water ingression, dirt, dust and other atmospheric elements. In in one non-limiting embodiment, the cover can be fabricated into the body of the electronic device/spotlight and is preferably not removable by normal operational means. To access the universal serial port 9, the user simply pulls the cover outward.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described combination lighting device and their locations, electronic communication methods between the system components, wiring, adapter/port types, attachment or securement mechanisms, dimensions, values, body shapes, etc. discussed above or shown in the drawings, if any, are merely by way of example and are not considered limiting and other component(s) and their locations, electronic communication methods, wiring, adapter/ port types, attachment or securement mechanisms, dimensions, values, body shapes, etc. can be chosen and used and all are considered within the scope of the disclosure.

Unless feature(s), part(s), component(s), characteristic(s) or functions(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to my "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed as a critical, required, or essential features or elements of any or all the claims.

While the electronic device/spotlight has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A spotlight capable of both providing light and powering an external electrical device, said spotlight comprising:
   a housing formed in the shape of a spotlight housing, the housing having a body member having a first end and a second end, a handle protruding from the body member;
   a light member disposed at the first end of the body member;
   a light circuit in communication with the light member for energizing the light member under certain conditions, the light circuit disposed within the body member;
   a single electrical port accessible through the second end of the body member; a rechargeable battery in communication with the light circuit, the rechargeable battery disposed within the body member; and
   a microcontroller disposed within the body member;
   a first switch in communication with the microcontroller for controlling operation of the light member;
   a second switch in communication with the microcontroller for controlling or activating the single electrical port for inputting or outputting energy from or to the rechargeable battery through the single electrical port; and
   a cover secured to the body member at the second end of the body member, said cover movable from a first position where the cover is positioned with respect to the body member such that it plugs into and covers the single electrical port and also covers the second switch to a second position where the cover is unplugged from the single electrical port and positioned with respect to the body member such that the single electrical port is exposed and accessible for use;
   wherein the microcontroller is programmed to allow energy from an external source to enter through the single electrical port and recharge the rechargeable battery and to allow energy from the rechargeable battery to exit through the single electrical port to provide energy to an external electrical device.

2. The spotlight of claim 1 wherein when the first switch is selected by a user, the microcontroller is programmed to disable operations through the single electrical port.

3. The spotlight of claim 1 wherein the second switch is disposed at the second end of the body member adjacent to the single electrical port.

4. The spotlight of claim 1 further comprising a battery charging circuit in communication with the rechargeable battery and in communication with the single electrical port, the battery charging circuit disposed within the body member, the battery charging circuit also in communication with the microcontroller.

5. The spotlight of claim 1 further comprising an output power supply circuit in communication with the microcontroller and with the rechargeable battery, the output power supply circuit disposed within the body member.

6. The spotlight of claim 1 wherein the single electrical port is a USB A port, a MINI-A port, a MINI-B port, a MICRO-AB port or a MICRO-B port.

7. The spotlight of claim 1 wherein the single electrical port has input and output energy transfer functionalities.

8. The spotlight of claim 1 wherein the single electrical port is a universal serial bus adapter port with bidirectional capabilities with input and output energy transfer functionalities.

9. The spotlight of claim 1 wherein the microcontroller is programmed to allow either the recharging of the rechargeable battery or the powering of the external electrical device at a specific instant in time and not both at the same time.

10. The spotlight of claim 9 wherein the single electrical port is a two-way port and acts as an input device when recharging the rechargeable battery and the acts as an output device when the rechargeable battery is providing power for the external second electrical device.

11. The spotlight of claim 1 wherein the microcontroller is programmed such that when a user presses the first switch the rechargeable battery is permitted to provide energy to the light member in connection with the light circuit.

12. The spotlight of claim 4 wherein the battery charging circuit is a switching regulator.

13. The spotlight of claim 1 wherein the external electrical device is adapted for electrical or mechanical coupling to the single electrical port directly or through a cord.

14. The spotlight of claim 5 wherein the output power supply circuit is a buck regulator.

15. A spotlight capable of both providing light and powering an external electrical device, said spotlight comprising:
   a housing formed in the shape of a spotlight, the housing having a body member having a first end and a second end, a handle protruding from the body member;
   a light member disposed at the first end of the body member;
   a light circuit in communication with the light member for energizing the light member under certain conditions, the light circuit disposed within the body member;
   a universal serial bus (USB) port with bidirectional capabilities with input and output energy transfer functionalities, said USB port accessible through the second end of the body member;
   a rechargeable battery in communication with the light circuit, the rechargeable battery disposed within the body member;
   a microcontroller disposed within the body member;
   a first switch in communication with the microcontroller tor controlling operation of the light member; and
   a second switch in communication with the microcontroller for controlling activating the USB port for inputting or outputting energy from or to the rechargeable battery through the USB port; wherein the second switch is disposed at the second end of the body member adjacent to the USB port;
   wherein the microcontroller is programmed such that when a user selects the first switch the rechargeable battery is permitted to provide energy to the light member in connection with the light circuit and the microcontroller is also programmed to disable operations through the USB port;
   wherein when the second switch is selected by the user the microcontroller is programmed to allow energy from an external source to enter through the USB port and recharge the rechargeable battery and to allow energy from the rechargeable battery to exit through the USB port to provide energy to an external electrical device, but not both at a same time;
   wherein the USB port is a two-way port and acts as an input device when recharging the rechargeable battery and the acts as an output device when the rechargeable battery is providing power for the external second electrical device.

16. The spotlight of claim 15 further comprising a battery charging circuit in communication with the rechargeable battery and in communication with the USB port, the battery charging circuit disposed within the body member, the battery charging circuit also in communication with the microcontroller.

17. The spotlight of claim 15 further comprising an output power supply circuit in communication with the microcontroller and with the rechargeable battery, the output power supply circuit disposed within the body member.

18. The spotlight of claim 15 wherein the external electrical device is adapted for electrical or mechanical coupling to the USB port directly or indirectly through a cord.

19. The spotlight of claim 15 further comprising a cover secured to the body member at the second end of the body member, said cover movable from a first position where the cover is positioned with respect to the body member such that it plugs into and covers the single electrical port and also covers the second switch to a second position where the cover is unplugged from the single electrical port and positioned with respect to the body member such that the single electrical port is exposed and accessible for use.

* * * * *